(12) United States Patent
Lindbom et al.

(10) Patent No.: US 11,233,555 B2
(45) Date of Patent: Jan. 25, 2022

(54) METHODS FOR ADAPTING DENSITY OF DEMODULATION REFERENCE SIGNALS

(71) Applicant: Telefonaktiebolaget LM Ericsson (publ), Stockholm (SE)

(72) Inventors: Lars Lindbom, Karlstad (SE); Mattias Frenne, Uppsala (SE); Martin Hessler, Linköping (SE); Karl Werner, Segeltorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/112,455

(22) Filed: Dec. 4, 2020

(65) Prior Publication Data

US 2021/0091841 A1 Mar. 25, 2021

Related U.S. Application Data

(63) Continuation of application No. 16/308,203, filed as application No. PCT/EP2017/075700 on Oct. 9, 2017, now Pat. No. 10,879,986.

(Continued)

(51) Int. Cl.
*H04L 5/10* (2006.01)
*H04B 7/06* (2006.01)
*H04L 5/00* (2006.01)
(Continued)

(52) U.S. Cl.
CPC ......... *H04B 7/0684* (2013.01); *H04L 5/0016* (2013.01); *H04L 5/0023* (2013.01);
(Continued)

(58) Field of Classification Search
CPC ............... H04W 72/042; H04W 24/10; H04W 72/0446; H04W 72/02; H04W 72/04;
(Continued)

(56) References Cited

U.S. PATENT DOCUMENTS 10,879,986 B2 * 12/2020 Lindbom ............... H04L 5/0016
2015/0155993 A1 6/2015 Berggren et al.
(Continued)

FOREIGN PATENT DOCUMENTS

| JP | 2015 528652 A | 9/2015 |
| KR | 10-2015-0078680 A | 12/2013 |
| KR | 10 2015 0117677 A | 10/2015 |

OTHER PUBLICATIONS

Korean Notice of Allowance issued for Application No. 10-2019-7013369—dated Oct. 30, 2020.
(Continued)

*Primary Examiner* — Rahel Guarino
(74) *Attorney, Agent, or Firm* — Baker Botts, LLP

(57) ABSTRACT

According to an aspect, a wireless node selects a set of reference signal antenna ports for use in transmitting data to other wireless nodes in a given transmit time interval, from a plurality of sets of reference signal antenna ports that are available for use and that include reference signal antenna ports having different reference signal densities in the frequency and/or time dimension. The wireless node sends a message to a second wireless node indicating a reference signal assignment and including an indication of the selected set of reference signal antenna ports.

22 Claims, 16 Drawing Sheets

Related U.S. Application Data

(60) Provisional application No. 62/406,753, filed on Oct. 11, 2016.

(51) Int. Cl.
*H04L 25/02* (2006.01)
*H04B 7/0413* (2017.01)

(52) U.S. Cl.
CPC .......... *H04L 5/0051* (2013.01); *H04L 5/0092* (2013.01); *H04L 5/10* (2013.01); *H04L 25/0224* (2013.01); *H04B 7/0413* (2013.01)

(58) Field of Classification Search
CPC ......... H04W 72/0413; H04W 72/0453; H04W 72/046; H04W 88/00; H04W 88/08; H04L 5/0023; H04L 27/2613; H04L 5/0094; H04L 5/0035; H04L 5/0092; H04L 5/0016; H04L 25/0224; H04L 5/0051; H04L 5/10; H04B 7/0684; H04B 7/0413
See application file for complete search history.

(56) References Cited

U.S. PATENT DOCUMENTS

| | | |
|---|---|---|
| 2015/0188679 A1 | 7/2015 | Lee |
| 2015/0230211 A1 | 8/2015 | You |
| 2016/0095105 A1 | 3/2016 | Chen et al. |
| 2016/0105264 A1 | 4/2016 | Chen et al. |
| 2018/0006706 A1* | 1/2018 | Cheng ................. H04B 7/0617 |
| 2019/0312696 A1 | 10/2019 | Kim |

OTHER PUBLICATIONS

International Search Report for International application No. PCT/EP2017/075700—dated Mar. 13, 2018.
Korean Notice of Opinion Submission issued for Application No. 10-2019-7013369—dated Apr. 24, 2020.
Japanese Office Action issued for Japanese Patent Application No. 2019/519394—dated Sep. 14, 2020.

* cited by examiner

500

SELECT A SET OF REFERENCE SIGNAL ANTENNA PORTS FOR USE IN TRANSMITTING DATA TO OR RECEIVING DATA FROM ONE OR MORE OTHER WIRELESS NODES IN A GIVEN TRANSMIT TIME INTERVAL, FROM A PLURALITY OF SETS OF REFERENCE SIGNAL ANTENNA PORTS THAT ARE AVAILABLE FOR USE, WHERE THE PLURALITY OF SETS OF REFERENCE SIGNAL ANTENNA PORTS INCLUDE REFERENCE SIGNAL ANTENNA PORTS HAVING DIFFERENT REFERENCE SIGNAL DENSITIES IN THE FREQUENCY DIMENSION, THE TIME DIMENSION, OR BOTH
502

SEND A MESSAGE TO A SECOND WIRELESS NODE INDICATING A REFERENCE SIGNAL ASSIGNMENT TO THE SECOND WIRELESS NODE, WHERE THE MESSAGE INCLUDES AN INDICATION OF THE SELECTED SET OF REFERENCE SIGNAL ANTENNA PORTS
504

RECEIVE, FROM A FIRST WIRELESS NODE, A MESSAGE INDICATING A REFERENCE SIGNAL ASSIGNMENT TO THE SECOND WIRELESS NODE, WHERE THE MESSAGE INCLUDES AN INDICATION OF A SET OF REFERENCE SIGNAL ANTENNA PORTS SELECTED FROM A PLURALITY OF AVAILABLE SETS OF REFERENCE SIGNAL ANTENNA PORTS KNOWN TO THE SECOND WIRELESS NODE, AND WHERE THE PLURALITY OF SETS OF REFERENCE SIGNAL ANTENNA PORTS INCLUDE REFERENCE SIGNAL ANTENNA PORTS HAVING DIFFERENT REFERENCE SIGNAL DENSITIES IN THE FREQUENCY DIMENSION AND/ OR TIME DIMENSION
702

IDENTIFY THE INDICATED SET OF REFERENCE SIGNAL ANTENNA PORTS FROM THE RECEIVED INDICATION
704

*FIG. 7*

Table 1

| DMRS merge bit-sequence | Max supported rank | Available ports |
|---|---|---|
| 00 | 8 | 0,1,2,3,4,5,6,7 |
| 10 | 6 | 2,3,6,7,8,9 |
| 01 | 4 | 8,9,10,11 |
| 11 | 2 | 12,13 |

*FIG. 8A*

Table 2

| Scheduled layers and associated antenna ports ||
|---|---|
| Value | Message |
| 0 | 1 layer, port 0 |
| 1 | 1 layer, port 1 |
| 2 | 1 layer, port 2 |
| 3 | 1 layer, port 3 |
| 4 | 2 layers, ports 0-1 |
| 5 | 2 layers, ports 2-3 |
| 6 | 2 layers, ports 4-5 |
| 7 | 2 layers, ports 6-7 |
| 8 | 3 layers port 2,3,6 |
| 9 | 4 layers port 2,3,6,7 |
| 10 | 1 layer port 8 |
| 11 | 2 layer port 8-9 |
| 12 | 1 layer port 10 |
| 13 | 2 layer port 10-11 |
| 14 | 1 layer port 12 |
| 15 | 2 layers port 12-13 |

*FIG. 8B*

METHODS FOR ADAPTING DENSITY OF DEMODULATION REFERENCE SIGNALS

PRIORITY

This application is a continuation, under 35 U.S.C. § 120 of U.S. patent application Ser. No. 16/308,203 filed on Dec. 7, 2018, which is a U.S. National Stage Filing under 35 U.S.C. § 371 of International Patent Application Serial No. PCT/EP2017/075700 filed Oct. 9, 2017 and entitled "METHODS FOR ADAPTING DENSITY OF DEMODULATION REFERENCE SIGNALS", which claims priority to U.S. Provisional Patent Application No. 62/406,753 filed Oct. 11, 2016, both of which are hereby incorporated by reference in their entirety.

TECHNICAL FIELD

The present application is generally related to wireless communication networks and is more particularly related to techniques for adapting the density of demodulation reference signals transmitted in such networks.

BACKGROUND

The 3$^{rd}$-Generation Partnership Project (3GPP) is developing standards for a so-called fifth-generation (5G) wireless communication system, to support ever-increasing demands for improved bandwidths and availability. Initial proposals for the access network portion of this system, i.e., the radio access network (RAN) portion of the 5G system, have referred to this new RAN with names such as "New Radio" (NR), or "Next Generation" (NG).

Regardless of the name, the physical layer of 5G mobile radio systems is expected to handle a vast number of different transmission scenarios that follow from the systems' support of multiple transmission numerologies, variable data transmission time intervals, and early decoding for latency-critical applications. These new scenarios impose a need for the physical layer to be even more flexible than was the case when the fourth-generation RAN referred to as Long Term Evolution (LTE) was first designed. In addition to these new transmission scenarios, the physical layer of a 5G system should handle, as it does in LTE, different transmission characteristics in terms of large variations in signal-to-interference-plus-noise ratio (SINR), Doppler, delay spreads, and channel richness.

As of the development of 4$^{th}$-generation (4G) networks, the conventional way of designing reference signals for coherent demodulation of physical layer control and data channels signals is to define a few reference signal patterns that can be configured for a certain transmission mode or for a certain transmit antenna setup. In LTE, downlink reference signals known as cell-specific reference signals (CRS) are broadcast in each cell, for use by all wireless devices (referred to as user equipments, or UEs, in 3GPP terminology) in measuring and estimating the characteristics of the downlink propagation channel. FIG. 1 illustrates the CRS patterns within an LTE slot for the cases of 1, 2 or 4 transmit antennas in downlink. It can be seen in the figure that CRS symbols for each one of up to four antenna ports (labeled AP0, AP1, AP2, and AP3) are transmitted in mutually exclusive sets of resource elements in the LTE slot. In the multi-port scenarios (2 Tx antennas and 4-antenna scenarios), it can be seen that from each transmit (TX) antenna port, "zero power" symbols are transmitted in the resource elements that are used for CRS symbols by any other antenna port.

These CRS patterns are statically configured and cannot be adapted to radio link conditions, as they are broadcast, and not UE-specific. However, LTE also supports UE-specific demodulation reference signals (DM-RS) in the downlink that, to some extent, can adapt to radio link conditions. These are especially useful for facilitating the measurement of radio link conditions to enable transmissions and reception of multiple MIMO (Multiple-Input Multiple-Output) layers.

FIG. 2 shows the DM-RS patterns used in LTE transmission modes 9 and 10, in which the DM-RS mapping to resource elements of the Orthogonal Frequency-Division Multiplexing (OFDM) time-frequency grid depends on the number of transmission layers. LTE supports up to 8-layer transmission in downlink by using a Walsh-Hadamard Orthogonal Cover Code (OCC) in time of either length-2 (up to 4-layers) or of length-4 (for more than 4-layers). In the case of length-4 OCC, the cover code is applied across two consecutive slots that define an LTE subframe and which also corresponds to a transmission time interval (TTI) of a data channel in LTE. The use of OCC is in FIG. 2 illustrated by a dashed box and in the case of length-2 OCC the two cover codes are [1 1] and [1 −1].

In the case of up to two layers, illustrated at the left side of FIG. 2, the DM-RS for each of one or two antenna ports is transmitted using six resource elements in each LTE slot. If two layers are transmitted, the DM-RS for each antenna port are transmitted in each slot using the same six resource elements, with the DM-RS for the two antenna ports being separated from one another by the orthogonal cover codes. In the case of more than two layers, as illustrated to the right side of FIG. 2, two slots are used together—this allows a length-two OCC in each slot to be effectively extended, into a length-four OCC. In the case of eight layers, then, four of the antenna ports transmit their respective DM-RS's on a first set of 12 resource elements in the two slots, with the DM-RS's being separated by length-four OCC's extending across the two slots. Likewise, the remaining four ports transmit their respective DM-RS's on a second set of 12 resource elements in the two slots, with the DM-RS's again being separated by length-four OCC's extending across the two slots. The OCC for the DM-RS for AP0 and AP2 (which are transmitted in different sets of resource elements) is [1 1 1 1]; the OCC for the DM-RS for AP1 and AP3 (which are transmitted in first and second sets of resource elements, respectively) is [1 −1 1 −1]; the OCC for the DMR-RS for AP4 and AP5 (transmitted in the first and second sets of resource elements, respectively) is [1 1 −1 −1]; and the DM-RS for AP6 and AP7 (the first and second sets of resource elements, respectively) is [1 −1 −1 1].

The LTE demodulation reference signal patterns were not designed to handle the latency-critical transmissions addressed in 5G. In particular, 5G systems are expected to require that DM-RS is transmitted at or near the beginning of each TTI, to enable early decoding. As can be seen in FIG. 2, the LTE DM-RS design places the DM-RS symbols at the end of each slot.

FIG. 3 shows a DM-RS structure that has been proposed for 5G to meet requirements of early decoding. In this structure, up to 8-layer MIMO transmissions are supported, where transmissions of DM-RS for up to four layers is done via a so-called 4 Combs, i.e., interleaved FDM with an interleaving distance of four subcarriers, whereas MIMO transmissions of more than 4-layers are done by introducing length-2 OCC in frequency per Comb. With this DM-RS structure, the demodulation and decoding of data could start almost directly after receiving the second OFDM symbol. In the illustration depicted in FIG. 3, a physical resource block (PRB) of 12 subcarriers has been assumed, which implies that a length-2 OCC in frequency relies on PRB bundling, as the cover code introduces dependencies in frequency domain between two consecutive PRBs.

The left-hand of FIG. 3 illustrates the location of the DM-RS for antenna ports 0 and 4. The DM-RS for these two ports occupy the same six resource elements in the PRB bundle (extending across 24 subcarriers), and are separated from one another by length-2 OCCs. Moving to the right, FIG. 3 next illustrates the DM-RS configuration for antenna ports 1 and 5—as seen in the figure, these occupy different resource elements from those used for antenna ports 0 and 4, and are in fact frequency-multiplexed with those resource elements. Again, the DM-RS for antenna ports 1 and 5 are separated from one another by length-two OCCs. Moving further to the right, FIG. 3 illustrates the DM-RS configuration for antenna ports 2 and 6, and then for antenna ports 3 and 7. The PRB bundling and the frequency multiplexing of the DM-RS allow all of the DM-RS symbols to be transmitted early in the time slot—in the illustrated approach, the DM-RS resides in the second OFDM symbol. This allows early reception of the DM-RS and fast channel estimation, for latency-critical applications.

SUMMARY

A problem with the solutions illustrated in FIGS. 2 and 3 and with similar solutions is that they produce an undesirable tradeoff—either the DM-RS patterns cannot meet the 5G requirements of early decoding, or the proposed DM-RS patterns for meeting the requirements for early decoding have too sparse a density for users that do not have sufficiently high SINR (e.g., cell edge users) or sufficiently good radio conditions for higher-rank transmissions (i.e., transmissions with a higher number of spatial layers). To efficiently support such users, a denser pattern is needed. However, such a denser pattern would generally require additional overhead, because of the additional resource elements needed for the pattern. Moreover, it is a problem to determine how to transmit information with different requirements on error probability simultaneously, in the same physical resource, with a common DM-RS structure.

On way to address different needs for DM-RS density, or other reference signal density, is to make the DM-RS density adaptable, so that it can be changed from one time-slot to another. However, the current semi-static configurations of DM-RS density are not sufficient to allow rapid adaptation to different requirements. Further, introducing adaptability of the DM-RS requires additional signaling. Still further, it is also a problem to determine how to adapt the DM-RS density to UEs in multi-user-MIMO (MU-MIMO) scheduling.

Various embodiments of the techniques and apparatus described herein address one or several of these problems by providing a solution in which an adaptable reference signal density is indicated and transmitted to the UE in a structured way, by merging antenna reference signal or antenna ports of lower density. In this way, the density can be adapted depending on the current needs. For example, in MU-MIMO scheduling, some scheduled UEs may need a higher reference signal density than others. The presently disclosed techniques facilitate efficient scheduling in such scenarios.

As described in detail below, one way to signal the adaptive reference signal density to the UE is by utilizing the fact that the signaling of higher reference signal density can simultaneously indicate a total transmitted rank restriction. In other words, by utilizing the correlation between the presence of low-SINR users and the best choice of rank, a lower overhead signaling solution is possible in the downlink control information (DCI) format.

As described in further detail below, in some embodiments of the presently disclosed techniques, a mobile device is semi-statically configured or dynamically indicated from the scheduling downlink control message, or a combination of both, with a reference signal pattern to support the envelope of the requirements of a current population of users. The densification of a reference signal is obtained by merging one or multiple reference signals (or ports) of lower density into new reference signals (or ports).

Accordingly, adapting for different densities of reference signal antenna ports may be effectuated by selecting of one or more sets of reference signal antenna ports from a plurality of available sets of reference signal antenna ports (possible configurations of reference signal antenna ports), where at least two of the sets in the plurality of sets of reference signal antenna ports have different densities. Therefore, the plurality of possible sets of reference signal antenna ports that may be selected for transmission or reception includes at least one or more sets of reference signal antenna ports arranged in a physical resource block (PRB) to have a relatively lower density (unmerged) and one or more sets of reference signal antenna ports arranged in a PRB to have a higher density (as if merged from PRBs with lower densities). Some sets in the plurality of sets of reference signal antenna ports may include even higher densities of reference signal antenna ports, as described below.

Effectively, the total number of reference signal ports (i.e., the maximum possible rank) is reduced, when higher densities are selected. For the purposes of illustration, the detailed description below considers the DM-RS structure shown in FIG. 3, where 4 combs are used in conjunction with length-2 OCC's, to be the baseline configuration for supporting up to 8 layers/antenna ports. It will be appreciated that the disclosed techniques can be applied to the adaptive densification of other baseline multi-port DM-RS configurations or other reference signal configurations, however.

According to some embodiments, a method, in a first wireless node, includes selecting a set of reference signal (e.g., DM-RS) antenna ports for use in transmitting data to or receiving data from one or more other wireless nodes in a given transmit time interval, from a plurality of sets of reference signal antenna ports that are available for use. The plurality of sets of reference signal antenna ports include reference signal antenna ports having different reference signal densities in the frequency and/or time dimension. The method also includes sending a message (e.g., scheduling message) to a second wireless node indicating a reference signal assignment to the second wireless node. The message includes an indication of the selected set of reference signal antenna ports.

According to some embodiments, a method, in a second wireless node, includes receiving, from a first wireless node, a message indicating a reference signal assignment to the second wireless node. The message includes an indication of a set of reference signal antenna ports selected from a plurality of available sets of reference signal antenna ports known to the second wireless node, and the plurality of sets of reference signal antenna ports include reference signal antenna ports having different reference signal densities in the frequency dimension and/or time dimension. The method further includes identifying the indicated set of reference signal antenna ports from the received indication.

According to some embodiments, a first wireless node is adapted to select a set of reference signal antenna ports for use in transmitting data to or receiving data from one or more other wireless nodes in a given transmit time interval, from a plurality of sets of reference signal antenna ports that are available for use. The plurality of sets of reference signal antenna ports include reference signal antenna ports having different reference signal densities in the frequency dimension, the time dimension, or both. The first wireless node is also adapted to send a message to a second wireless node indicating a reference signal assignment to the second wireless node. The message includes an indication of the selected set of reference signal antenna ports.

According to some embodiments, a second wireless node is adapted to receive, from a first wireless node, a message indicating a reference signal assignment to the second wireless node, where the message includes an indication of a set of reference signal antenna ports selected from a plurality of available sets of reference signal antenna ports known to the second wireless node, where the plurality of sets of reference signal antenna ports include reference signal antenna ports having different reference signal densities in the frequency dimension and/or time dimension. The second wireless node is also adapted to identify the indicated set of reference signal antenna ports from the received indication.

According to some embodiments, a first wireless node configured for operation in a wireless communication network includes a transceiver circuit and a processing circuit operatively coupled to the transceiver circuit. The processing circuit is configured to select a set of reference signal antenna ports for use in transmitting data to or receiving data from one or more other wireless nodes in a given transmit time interval, from a plurality of sets of reference signal antenna ports that are available for use, where the plurality of sets of reference signal antenna ports include reference signal antenna ports having different reference signal densities in the frequency dimension and/or time dimension. The processing circuit is also configured to send to a second wireless node, via the transceiver circuit, a message indicating a reference signal assignment to the second wireless node, where the message includes an indication of the selected set of reference signal antenna ports.

According to some embodiments, a second wireless node configured for operation in a wireless communication network includes a transceiver circuit and a processing circuit operatively coupled to the transceiver circuit. The processing circuit is configured to receive from a first wireless node, via the transceiver circuit, a message indicating a reference signal assignment to the second wireless node, where the message includes an indication of a set of reference signal antenna ports selected from a plurality of available sets of reference signal antenna ports known to the second wireless node. The plurality of sets of reference signal antenna ports include reference signal antenna ports having different reference signal densities in the frequency dimension and/or time dimension. The processing circuit is also configured to identify the indicated set of reference signal antenna ports from the received indication.

The processing circuit is configured to carry out any example of the method or apparatus described, in some examples, in association with the transceiver circuit.

Further aspects of the present invention are directed to an apparatus, computer program products or computer readable storage medium corresponding to the methods summarized above and functional implementations of the above-summarized apparatus and wireless device.

Details of various methods and apparatuses are provided below. In addition, an enumerated list of example embodiments of the presently disclosed techniques and apparatuses is provided.

BRIEF DESCRIPTION OF THE FIGURES

FIG. 5 is a process flow diagram illustrating a method in the network node, according to some embodiments.

FIG. 7 is a process flow diagram illustrating a method in the wireless device, according to some embodiments.

FIG. 8A illustrates a table that is an example of mapping using two indicator bits to indicate a set of available ports, according to some embodiments.

FIG. 8B illustrates an example antenna port table with port numbers referring to the DM-RS densities exemplified in FIGS. 9 to 11, according to some embodiments.

DETAILED DESCRIPTION

The presently disclosed techniques are described in the context of improvements to the LTE wireless communications standards, as might be adopted in standards for a 5G wireless communications system used in conjunction with or to replace the existing LTE systems. More particularly, the presently disclosed techniques are described by using an Orthogonal Frequency-Division Multiple Access (OFDMA) signal structure like that used in LTE, e.g., with twelve subcarriers per physical resource block (PRB) and seven OFDM symbols per slot (assuming a "normal" cyclic prefix), etc. It should be understood, however, that the techniques are more generally applicable to other wireless communications networks and other OFDMA signal structures.

Furthermore, it will be appreciated that the terms "user equipment" or "UE" are used herein for convenience, as these are commonly used in 3GPP documentation. For the purpose of understanding the scope of the presently disclosed techniques and apparatuses, however, these terms should be understood more generally, as referring to wireless devices configured to operate as access terminals in a wireless communication network, whether those wireless devices are consumer-oriented devices such as cellular telephones, smartphones, wireless-equipped laptops, tablets, or the like, or machine-to-machine (M2M) devices for use in industrial applications or in enabling the Internet of Things (IoT). Likewise, the terms eNB and eNodeB, as used herein, should be understood to refer generally to base stations or wireless access nodes in a wireless communications system.

Figure 1:
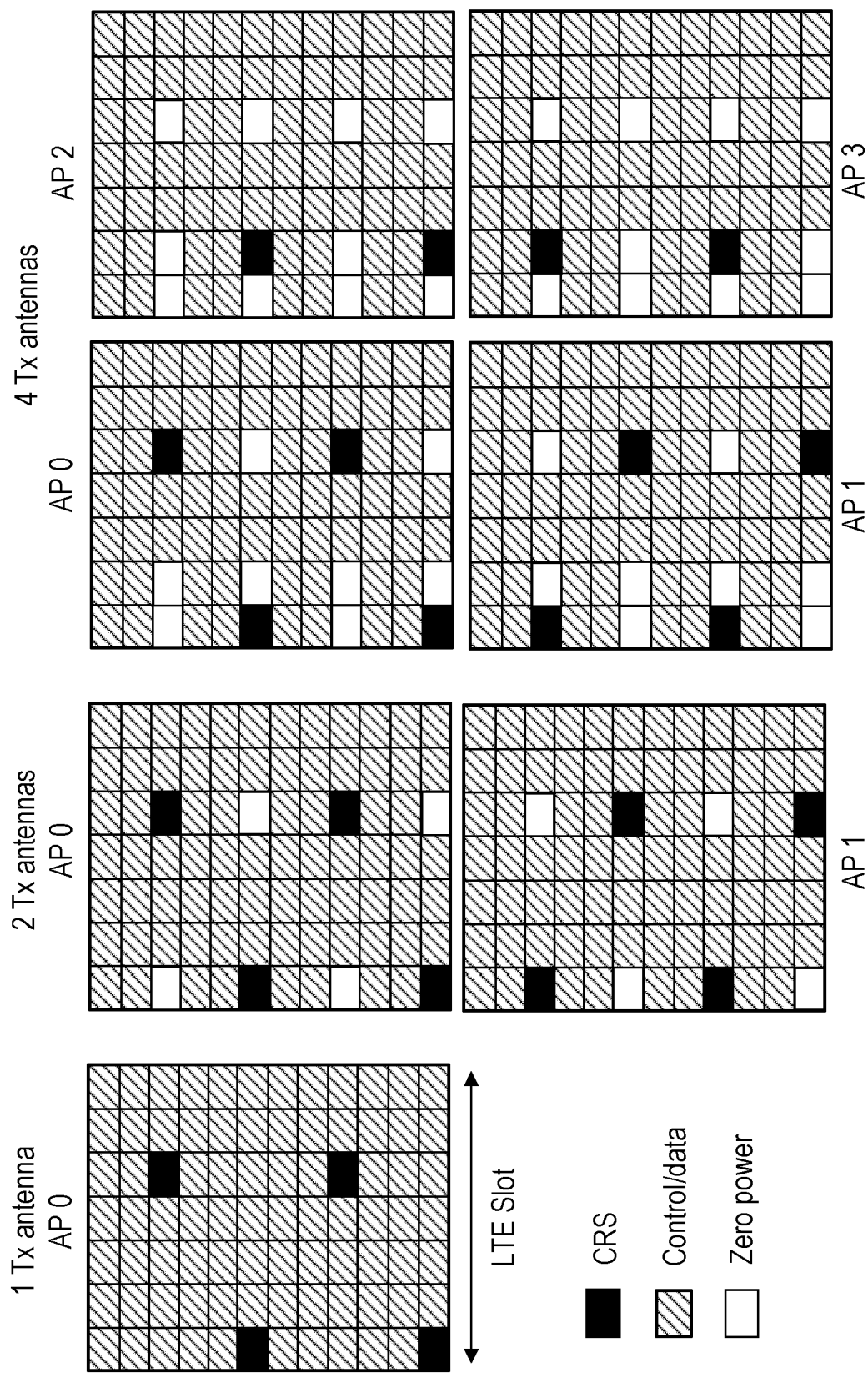
FIG. 1 illustrates CRS patterns in LTE.
Figure 2:
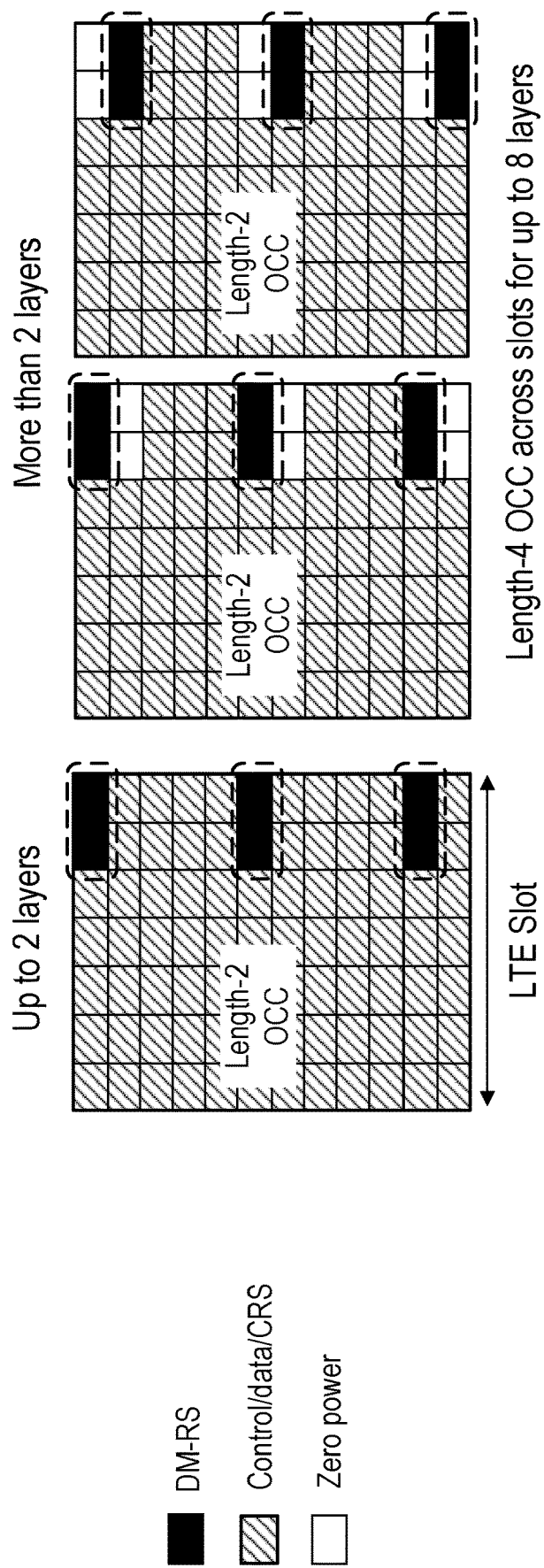
FIG. 2 shows UE-specific DM-RS patterns in LTE downlink.
Figure 3:
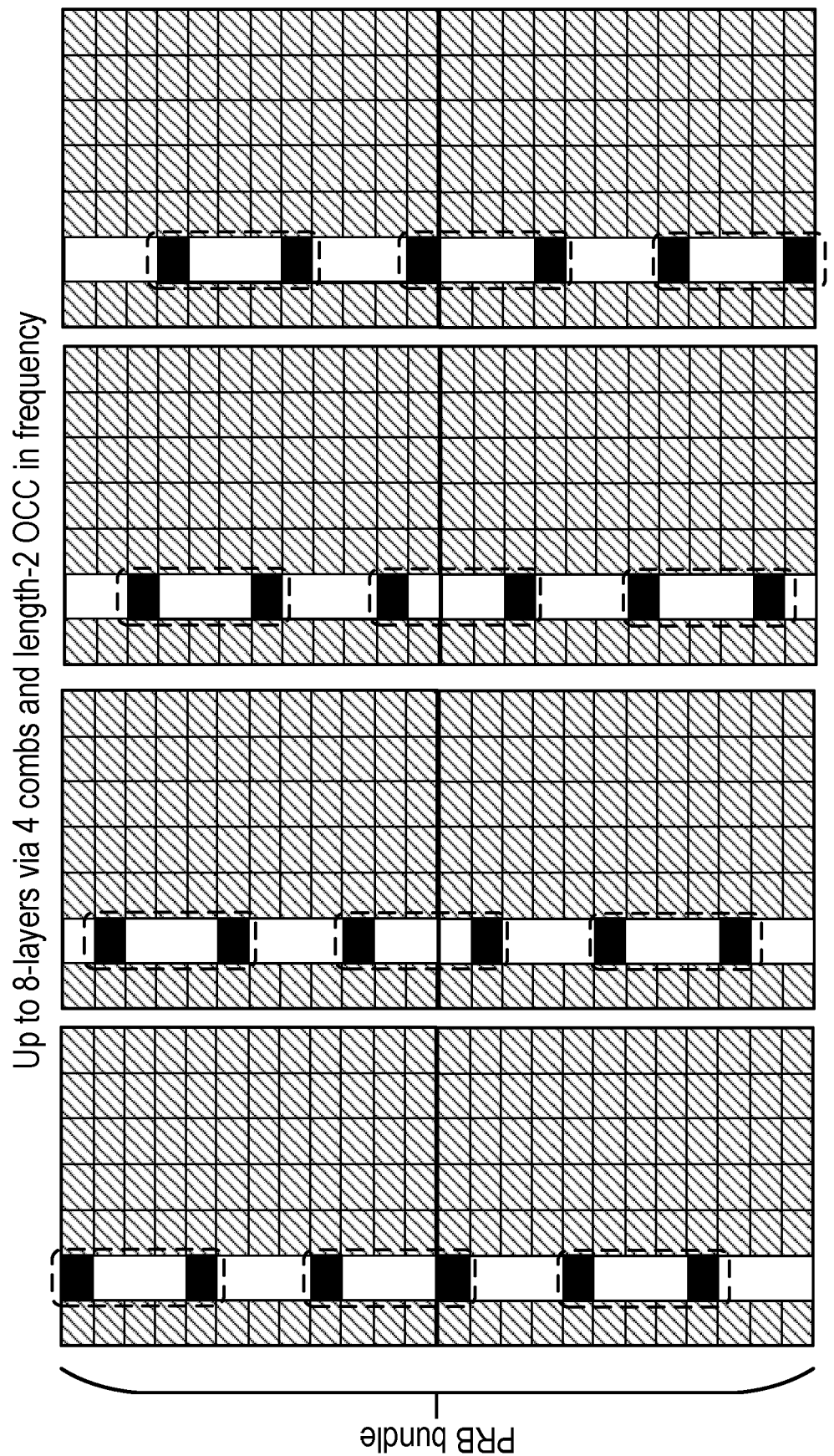
FIG. 3 illustrates a DM-RS structure targeting early decoding.

As discussed above, a problem with the solutions illustrated in FIGS. 2 and 3 for transmitting DM-RS is that they produce an undesirable tradeoff—either the DM-RS patterns cannot meet the 5G requirements of early decoding, or the proposed DM-RS patterns for meeting the requirements for early decoding have too sparse a density for users that do not have sufficiently high SINR (e.g., cell edge users) or sufficiently good radio conditions for higher-rank transmissions (i.e., transmissions with a higher number of spatial layers). To efficiently support such users, a denser pattern would be needed. However, such a denser pattern would generally require additional overhead, because of the additional resource elements needed for the pattern. Moreover, it is a problem to not know how to transmit information with different requirements on error probability simultaneously, in the same physical resource, with a common DM-RS structure.

Handling different needs for DM-RS density can be addressed by making the DM-RS density adaptable, e.g., so that it can be changed from one time-slot to another. Introducing adaptability of the DM-RS generally requires additional signaling. Further, it is also a problem figuring how to adapt the DM-RS density to UEs in MU-MIMO scheduling.

Various embodiments of the techniques and apparatus described herein address one or several of these problems by providing a solution in which an adaptable reference signal density is indicated and transmitted to the UE in a structured way, by merging antenna reference signal or antenna ports of lower density. In this way, the density can be adapted depending on the current needs. For example, in multi-user-MIMO (MU-MIMO) scheduling, some scheduled UEs may need a higher reference signal density than others. The presently disclosed techniques facilitate efficient scheduling in such scenarios. In some of the example scenarios below, DM-RS is used for a reference signal, but it should be understood that the techniques are applicable to other reference signals.

According to the various embodiments described herein, each antenna port that might be used at any given time is associated with a certain reference signal structure/pattern that is known to both the transmitting and receiving devices. Thus, within the context of the presently disclosed techniques, a given antenna port corresponds to a particular DM-RS pattern, and the terms "DM-RS port" and "DM-RS antenna port" may be understood as referring to a combination of antenna port and DM-RS pattern. Because an antenna port, as that term is used herein, need not necessarily correspond to a single physical antenna port, it will be appreciated that the labeling of antenna ports is, at least from the perspective of the receiving device, arbitrary. A receiving device (e.g., a UE) receiving either a single-layer or multiple-layer transmission needs to be informed via a signaling message (e.g., an "assignment" or "grant") about the specific port or ports that are used, as well as the rank of the transmission, in order to perform demodulation of the signal transmitted to it. The same thing also applies in uplink transmissions where a UE is receiving a grant indicating the DM-RS and corresponding rank to be used for the uplink transmission.

In the various embodiments, a wireless device is semi-statically configured or dynamically indicated from a message (e.g., scheduling downlink control message), or a combination of both, with a DM-RS pattern selected to support the envelope of the requirements of a current population of users. The densification of DM-RS to support challenging signal conditions is obtained by merging one or multiple DM-RS (or antenna ports) of lower density into new DM-RS (or antenna ports). Effectively, the total number of DM-RS antenna ports (i.e., the maximum possible rank) is reduced, in an adaptable manner.

The signaling of the possibly merged antenna ports and corresponding rank restrictions is conveyed in a physical layer control signaling message via a DCI format that is designed to preserve scheduling flexibility in MIMO and in particular in MU-MIMO operations, while minimizing the required signaling. The densification of the DM-RS pattern that results from the merging of antenna ports is motivated by the fact that multiplexed UEs can have different SINR conditions. The adaptive use of antenna ports with different DM-RS patterns provides for an improved ability to match the most appropriate multi-rank transmissions to UEs with varying signaling conditions.

For the purposes of illustration, the DM-RS structure illustrated in FIG. 3 is used as the baseline configuration for supporting up to 8 layers, with various adaptively obtained densified patterns derived from this baseline configuration. It should be understood, however, that other DM-RS structures could be used as the baseline configuration.

Figure 4:
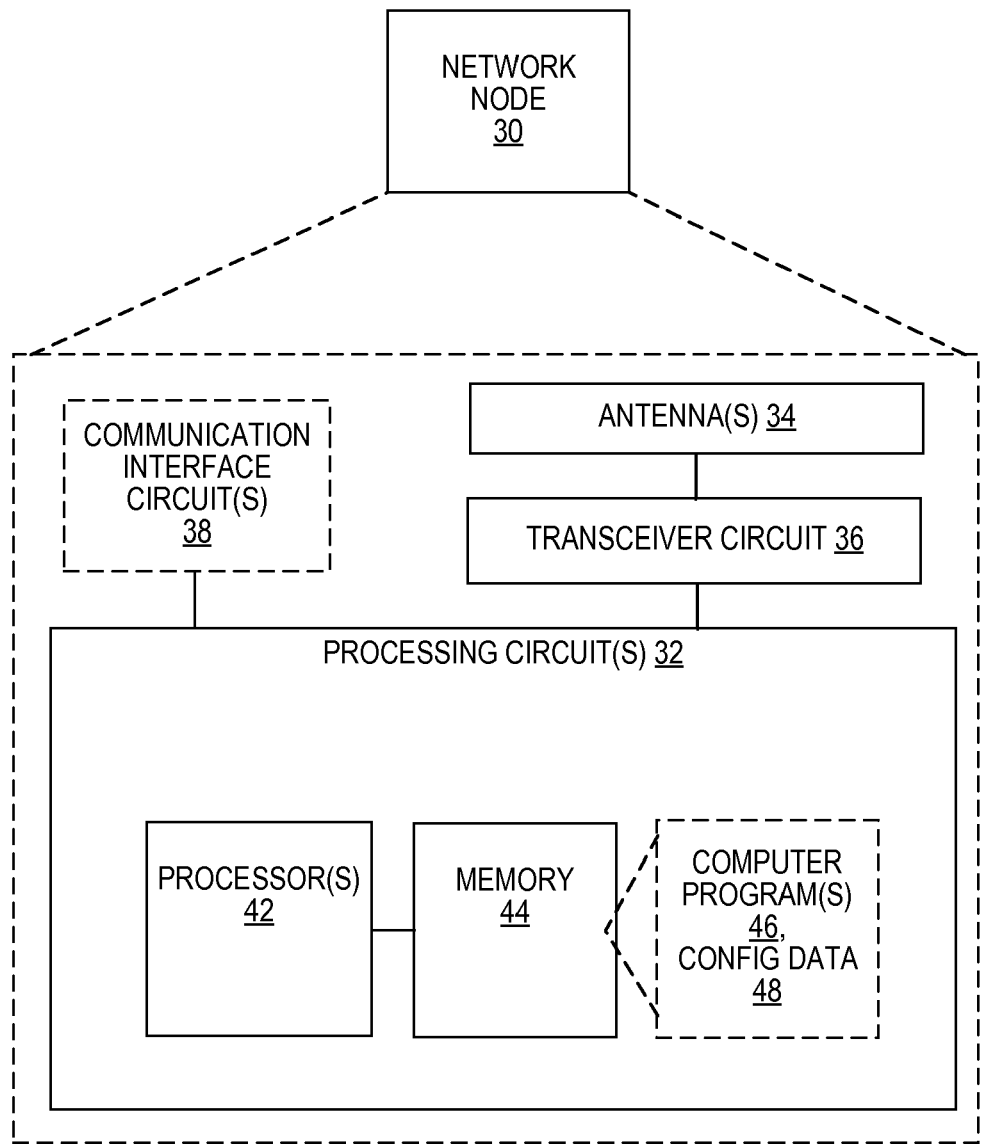
FIG. 4 is a block diagram illustrating an example network node, such as a base station.

FIG. 4 is a block diagram illustrating an example in a first wireless node, such as a network node 30 (e.g., base station), which may be configured to carry out embodiments of the techniques for adaptable densification of a reference signal, such as a DM-RS. The network node 30 provides an air interface to a wireless device, e.g., an LTE or 5G air interface or WLAN air interface for downlink transmission and uplink reception, which is implemented via antennas 34 and a transceiver circuit 36. The transceiver circuit 36 includes transmitter circuits, receiver circuits, and associated control circuits that are collectively configured to transmit and receive signals according to a radio access technology, for the purposes of providing cellular communication, or WLAN services if necessary. According to various embodiments, cellular communication services may be operated according to any one or more of the relevant 3GPP cellular standards, including those for 5G. The network node 30 also includes communication interface circuits 38 for communicating with nodes in the core network, other peer radio nodes, and/or other types of nodes in the network.

The network node 30 also includes one or more processing circuits 32 that are operatively associated with and configured to control the communication interface circuit(s) 38 and/or the transceiver circuit 36. The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any combination thereof. More generally, the processing circuit 32 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processing circuit 32 of the network node 30 is configured to select a set of reference signal (e.g., DM-RS) antenna ports for use in transmitting data to or receiving data from one or more wireless devices in a given transmit time interval, from a plurality of sets of reference signal antenna ports that are available for use, where the plurality of sets of reference signal antenna ports include reference signal antenna ports having different reference signal densities in the frequency dimension, the time dimension, or both. The processing circuit 32 of the network node 30 is further configured to send, to a wireless device, a message (e.g., scheduling message) indicating a reference signal assignment to the wireless device, using transceiver circuit 36, where the message includes an indication of the selected set of reference signal antenna ports.

Note that in this and in the other embodiments described herein, the message discussed here might be one of several messages that together inform the wireless device of the reference signal assignment. For example, rather than having one large set of 16 port-layer options being identified comprehensively in a single downlink control information (DCI), some embodiments may use RRC signaling to transmit part of the information. For example, the RRC may identify a subset, say four, of the 16 port-layer options, with a subsequent DCI message indicating exactly which of the port-layer options within that group of four applies. This would reduce the DCI signaling bits; the RRC signaling may be carried out less frequently.

In some instances, the processing circuit 32 is further configured to transmit data to the wireless device (and, optionally, to one or more other wireless devices, in the case of multi-user MIMO), using the transceiver circuit 36, where the transmitted data accompanied by reference signal symbols on the indicated/selected set of reference signal antenna ports, or receive data from the second wireless node, using the selected set of reference signal antenna ports, where using the selected set of reference signal antenna ports comprises performing channel estimation using reference signal symbols on the selected set of reference signal antenna ports.

In some embodiments, the processing circuit 32 is configured to perform a method for scheduling a data transmission to or from a wireless device, such as method 500 shown in FIG. 5. The method 500 includes selecting a set of reference signal (e.g., DM-RS) antenna ports for use in transmitting data to or receiving data from one or more wireless devices in a given transmit time interval, from a plurality of sets of reference signal antenna ports that are available for use (block 502). The plurality of sets of reference signal antenna ports include reference signal antenna ports having different reference signal densities in the frequency dimension, the time dimension, or both. The method 500 further includes sending a message (e.g., scheduling message) to a wireless device indicating a reference signal assignment to the wireless device, where the message includes an indication of the selected set of reference signal antenna ports (block 504).

The message may indicate a number of layers of a multi-layer transmission on which the selected set of reference signal antenna ports are for use in the transmitting or receiving of data. The message may also indicate one or more values of a plurality of values, where the indicated one or more values correspond to the selected set of one or more reference signal antenna ports, and where the plurality of values corresponds to reference signal antenna ports having different reference signal densities and/or a different number of layers on which the selected set of reference signal antenna ports are for use. The plurality of values may be a single set of values corresponding to all of the plurality of sets of reference signal antenna ports that are available for use.

In some cases, the message indicates to the second wireless node different reference signal densities for different layers in a multi-layer transmission.

In another set of embodiments, the reference signal antenna port of the selected set of reference signal antenna ports may have a code-time-frequency or time-frequency pattern which is orthogonal to a further reference signal antenna port of the selected set of reference signal antenna ports having a different reference signal density. The reference signal antenna ports may comprise a time-frequency pattern comprising a frequency comb, and/or the reference signal antenna ports may have different densities in the frequency dimension comprise different densities of frequency comb.

The reference signal antenna port of the selected set of reference signal antenna ports may have a time-frequency pattern which is a merger of a plurality of time-frequency patterns of a plurality of reference signal antenna ports of the plurality of sets of reference signal antenna ports that are available for use. The selecting of the set of reference signal antenna ports may comprise not selecting a reference signal antenna port having a time-frequency pattern which is merged to provide a reference signal antenna port of the selected set of reference signal antenna ports. The reference signal antenna port may have a time-frequency pattern with a higher density is a merger of time-frequency patterns of first and second reference signal antenna ports having lower density patterns. The reference signal antenna port may have a time-frequency pattern with a still higher density is a merger of time-frequency patterns of third and fourth reference signal antenna ports having the higher density pattern.

The selected set of reference signal antenna ports may comprise reference signal antenna ports having time-frequency patterns of different density. The reference signal antenna port may correspond to a mapping on a code-time-frequency grid.

In some cases, the transmitting or receiving of data is on one or more layers of a multi-layer Multiple-Input Multiple-Output (MIMO) transmission.

In some cases, as suggested above, sending the message may comprise sending a scheduling message, and/or wherein the reference signal antenna port is a DM-RS antenna port. While some examples may include a DM-RS antenna port and a scheduling message, the techniques described herein are applicable more generally to other reference signals and messages.

Additional examples of the method 500 include, in some cases, transmitting data to the wireless device (and, optionally, to one or more other wireless devices, in the case of multi-user MIMO), accompanied by reference signal symbols (in these examples, DM-RS symbols) on the indicated/selected set of DM-RS antenna ports. In other cases, the signaling indicates an uplink assignment, and the method 500 further comprises receiving data from the wireless device, using the indicated/selected DM-RS antenna ports, where using the indicated/selected DM-RS antenna ports comprises performing channel estimation using DM-RS symbols on the indicated/selected set of DM-RS antenna ports.

In some embodiments, the signaling may comprise two-part signaling. In such embodiments, the scheduling message includes a first set of bits indicating the selected set of DM-RS antenna ports and a second set of bits indicating which DM-RS antenna ports are assigned to the second wireless node and indicating a transmission rank associated with the assigned DM-RS antenna ports. The number of bits in the second set of bits and/or the encoding of the second bits depends on the contents of the first set of bits.

Figure 6:
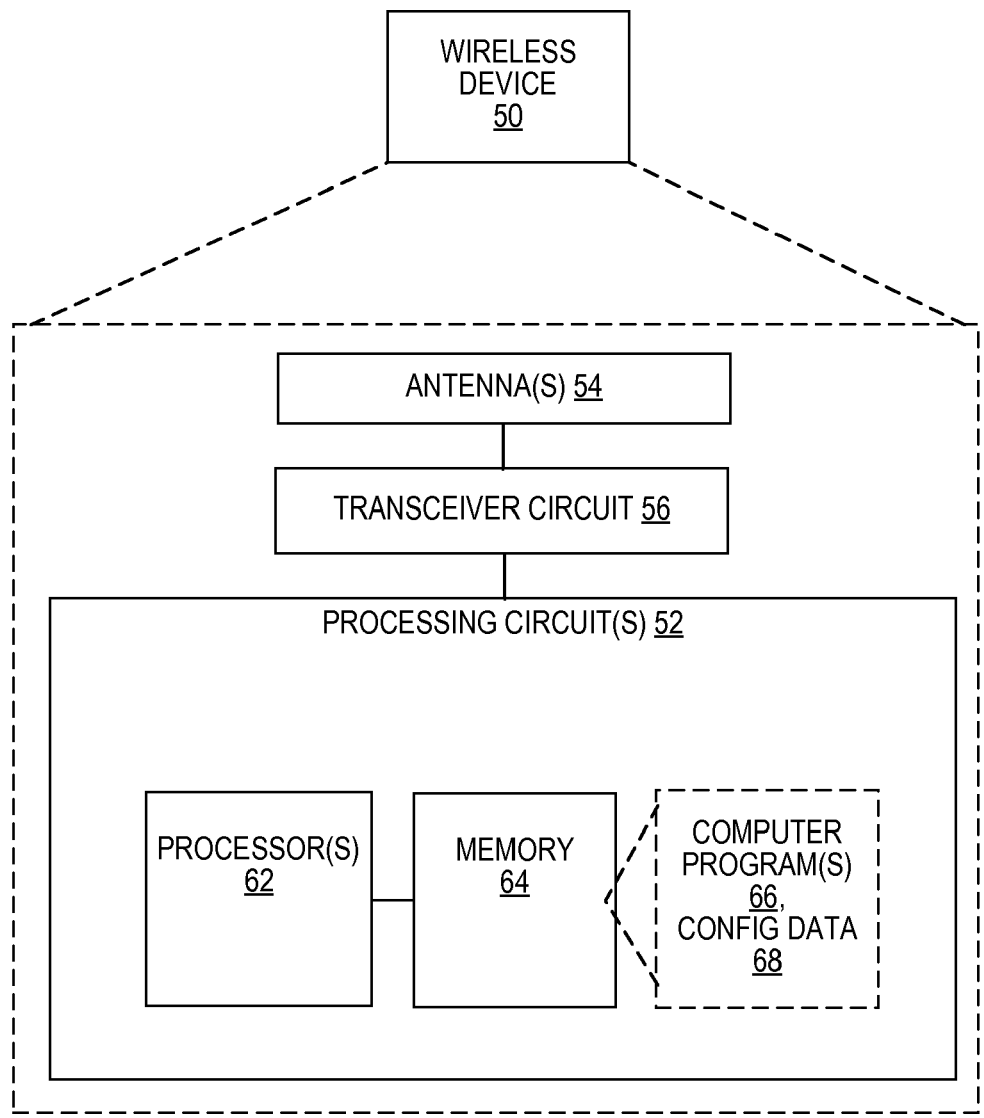
FIG. 6 is a block diagram illustrating an example wireless device, such as a UE.

FIG. 6 illustrates an example wireless device 50 (e.g., UE) that is configured to perform the techniques described herein for the second wireless node. The wireless device 50 may also be considered to represent any wireless devices that may operate in a network and that are capable of communicating with a network node or another wireless device over radio signals. The wireless device 50 may also be referred to, in various contexts, as a radio communication device, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the wireless device 50.

Accordingly, in some embodiments, the processing circuit 52 of the wireless device 50 is configured to, as a second wireless node, use the transceiver circuit 56 to receive a message (e.g., scheduling message) indicating a reference signal (e.g., DM-RS) assignment to the UE, where the message includes an indication of a set of reference signal antenna ports selected from a plurality of available sets of reference signal antenna ports known to the UE, where the plurality of sets of reference signal antenna ports include reference signal antenna ports having different reference signal densities in the frequency dimension and/or time dimension. The processing circuit 52 is further configured to identify the indicated set of reference signal antenna ports from the received indication.

In some cases, the processing circuit 52 is further configured to receive data via the transceiver circuit 56, using the indicated/selected reference signal antenna ports, where using the indicated/selected reference signal antenna ports comprises performing channel estimation using reference signal symbols on the indicated/selected set of reference signal antenna ports. In other cases, the signaling indicates an uplink assignment, and the processing circuit 52 is further configured to use the transceiver circuit 56 to transmit data, accompanied by reference signal symbols on the indicated/selected set of reference signal antenna ports.

In some embodiments, the wireless device 50 is configured to perform a method 700, as shown in FIG. 7. The method 700 includes receiving a scheduling message indicating a reference signal assignment to the wireless device, where the scheduling message includes an indication of a set of reference signal antenna ports selected from a plurality of available sets of reference signal antenna ports known to the wireless device, and where the plurality of sets of reference signal antenna ports include reference signal antenna ports having different reference signal densities in the frequency dimension and/or time dimension (block 702). The method 700 further comprises identifying the indicated set of reference signal antenna ports from the received indication (block 704).

The message may indicate a number of layers of a multi-layer transmission on which the selected set of reference signal antenna ports are for use in the transmitting or receiving of data. The message may also indicate one or more values of a plurality of values, where the indicated one or more values correspond to the selected set of one or more reference signal antenna ports, and where the plurality of values corresponds to reference signal antenna ports having different reference signal densities and/or a different number of layers on which the selected set of reference signal antenna ports are for use. The plurality of values may be a single set of values corresponding to all of the plurality of sets of reference signal antenna ports that are available for use.

In some cases, the message indicates to the second wireless node different reference signal densities for different layers in a multi-layer transmission.

In another set of embodiments, the reference signal antenna port of the selected set of reference signal antenna ports may have a code-time-frequency or time-frequency pattern which is orthogonal to a further reference signal antenna port of the selected set of reference signal antenna ports having a different reference signal density. The reference signal antenna ports may comprise a time-frequency pattern comprising a frequency comb, and/or the reference signal antenna ports may have different densities in the frequency dimension comprise different densities of frequency comb.

The reference signal antenna port of the selected set of reference signal antenna ports may have a time-frequency pattern which is a merger of a plurality of time-frequency patterns of a plurality of reference signal antenna ports of the plurality of sets of reference signal antenna ports that are available for use. The selecting of the set of reference signal antenna ports may comprise not selecting a reference signal antenna port having a time-frequency pattern which is merged to provide a reference signal antenna port of the selected set of reference signal antenna ports. The reference signal antenna port may have a time-frequency pattern with a higher density is a merger of time-frequency patterns of first and second reference signal antenna ports having lower density patterns. The reference signal antenna port may have a time-frequency pattern with a still higher density is a merger of time-frequency patterns of third and fourth reference signal antenna ports having the higher density pattern.

The selected set of reference signal antenna ports may comprise reference signal antenna ports having time-frequency patterns of different density. The reference signal antenna port may correspond to a mapping on a code-time-frequency grid.

In some cases, the method 700 further comprises receiving data, using the indicated/selected reference signal antenna ports, where using the indicated/selected reference signal antenna ports comprises performing channel estimation using reference signal symbols on the indicated/selected set of reference signal antenna ports. In other cases, the signaling indicates an uplink assignment, and the method 700 further comprises transmitting data, accompanied by reference signal symbols on the indicated/selected set of reference signal antenna ports. In some cases, the transmitting or receiving of data is on one or more layers of a multi-layer MIMO transmission.

In some cases, as suggested above, sending the message may comprise sending a scheduling message, and/or wherein the reference signal antenna port is a DM-RS antenna port. As previously stated, while some examples include a DM-RS antenna port and a scheduling message, the techniques described herein are applicable more generally to other reference signals and messages.

In some embodiments, the signaling may comprise two-part signaling. For instance, a first bit or a set of bits may be used to indicate to a wireless device how the reference signal (e.g., DM-RS) are mapped, or densified, on a time-frequency grid related to an OFDM-based transmission, relative to a particular baseline configuration that is already known to the UE. A second set of bits may be used to indicate the actual rank and/or choice of transmission ports.

This densifying and signaling procedure is exemplified below in FIGS. 9 through 11 with a corresponding signaling given by Table 1 of FIG. 8A. DM-RS is used as a representative reference signal in these examples.

Figure 9:
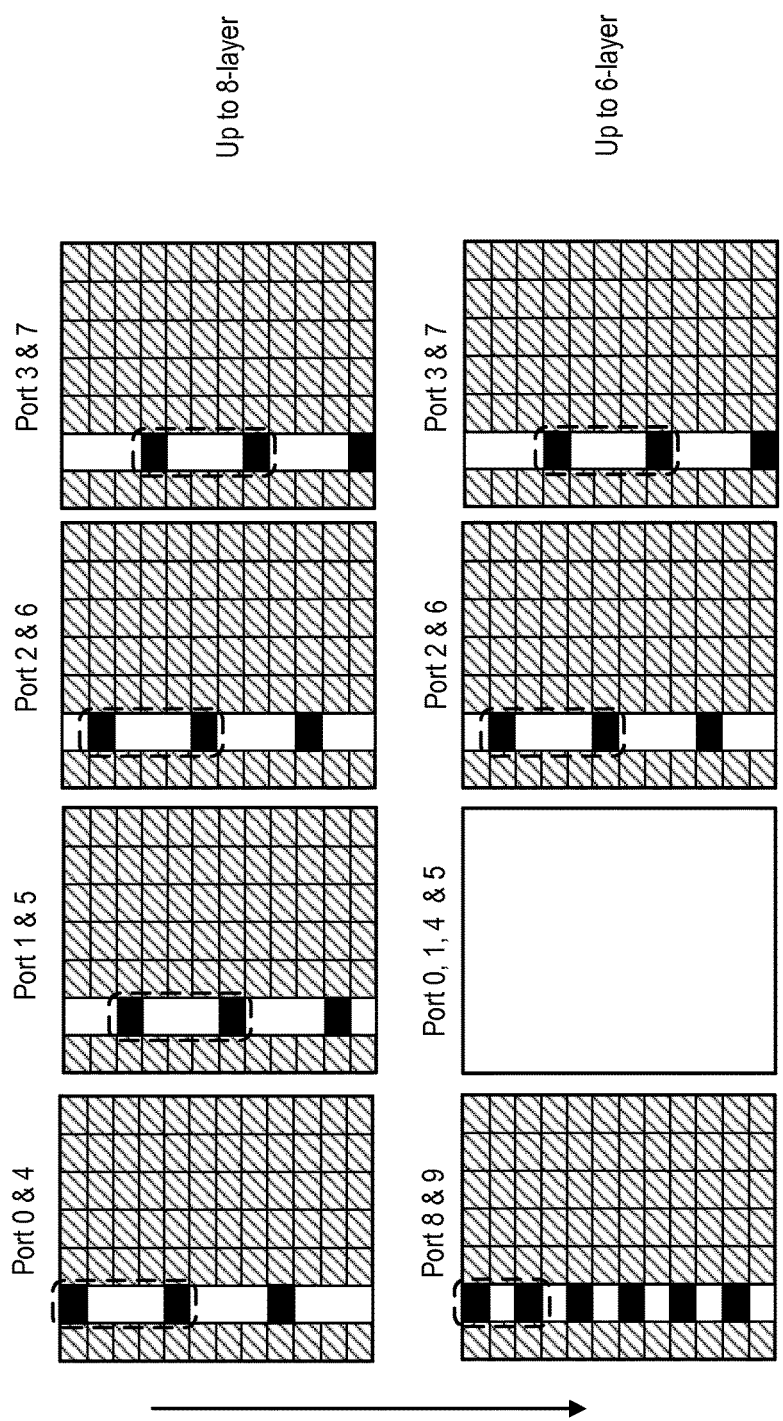
FIG. 9 shows baseline rank-8 DM-RS patterns densified to rank-6 DM-RS patterns, according to some embodiments.

From the baseline pattern shown in the upper part of FIG. 9, it can be seen that only three resource elements per layer (antenna port) per physical resource block (PRB) are used in the frequency domain for DM-RS. In some scenarios, this will be an insufficient density for accurate demodulation.

One method to obtain a denser pattern for some layers of the DM-RS comb structure in FIG. 9 is to merge ports 0 & 4 and ports 1 & 5 into two new ports, here referred to as ports 8 and 9. This merger is shown in the bottom part of FIG. 9. As seen in the left-hand side of FIG. 9, at the bottom, there are twice as many resource elements used for ports 8 and 9 as are used for either ports 0 & 4 or ports 1 & 5 in the baseline configuration at the top. Moving to the right in FIG. 9, it can be seen that ports 0, 1, 4, and 5 are not used after this merger. The DM-RS for ports 2, 3, 6, and 7 remain the same, in this particular example. Note that the port numbering/labeling and the choice of which pairs of ports to merge is arbitrary, and may vary from one design to another. FIG. 9 simply illustrates one example, where two pairs of antenna ports and their corresponding DM-RS are merged, to form a new pair of antenna ports having DM-RS that are twice as dense.

A consequence of this merge is that it will not be possible to assign higher than rank 6 to any user. Note, however, that this implies that fewer bits are needed for this signaling. Another consequence of this merging of two pairs of ports is that the ports in the resulting OFDM symbol/slots have unequal DM-RS densities. The ports 8 and 9 have higher port density than the remaining ports at the cost of supporting a lower number of maximum ports. This actually provides several advantages. First, the ports having higher DM-RS densities can be used to transmit/demodulate transmitted information that is more sensitive to errors, such as control information or HARQ-ACK information, or data that has higher reliability such as the ultra-reliable and low latency use cases (URLLC) that are expected to be important in next-generation wireless systems.

The example densification shown in FIG. 9 can be extended, to provide densification of other pairs of ports and/or to provide even further densification. FIG. 10 and FIG. 11 show the procedure of further densifying the DM-RS pattern and restricting the available ports when going from highest rank of 6 to rank 4 and when going from highest rank of 4 to rank 2, respectively.

Figure 10:
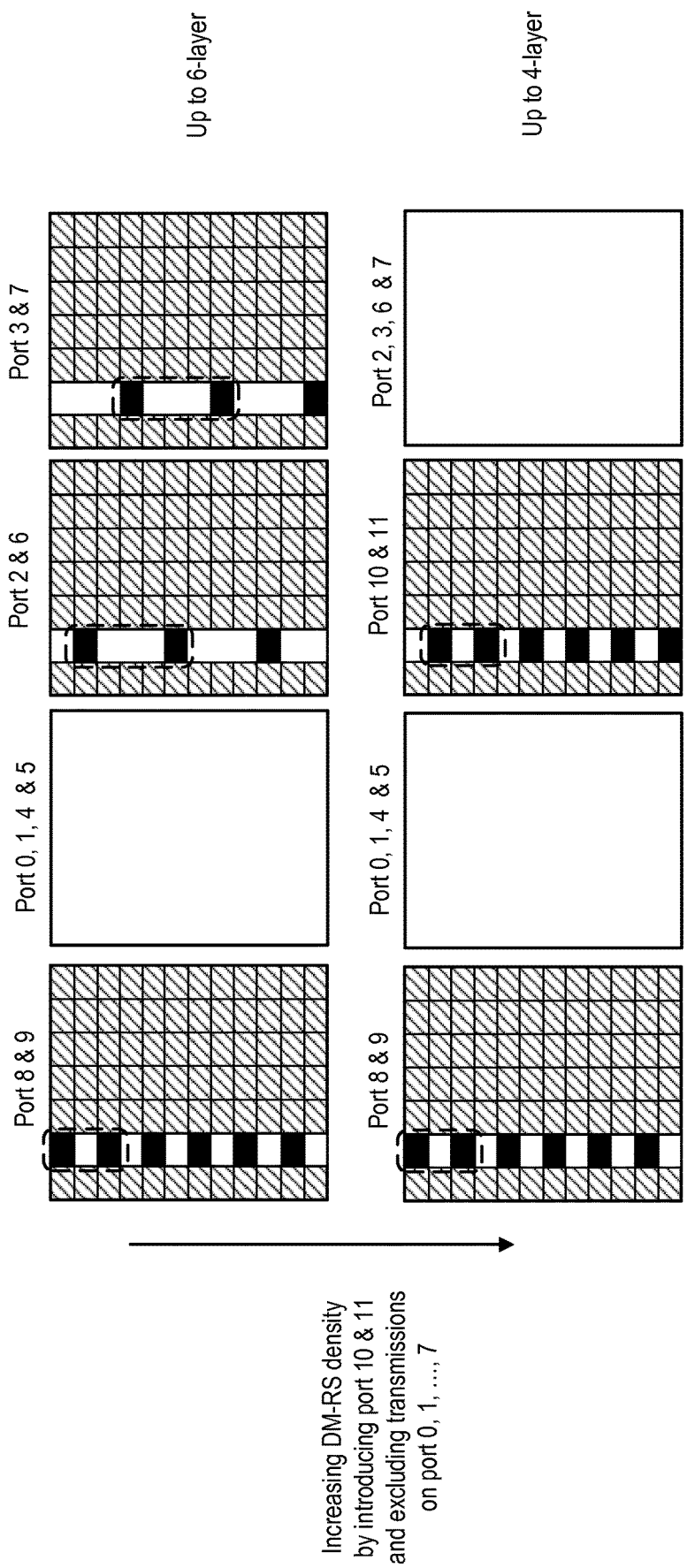
FIG. 10 shows rank-6 DM-RS patterns densified to rank-4 DM-RS patterns, according to some embodiments.

More particularly, FIG. 10 shows how the densification shown in FIG. 9 is extended to include the merging of ports 2 & 6 with ports 3 & 7, to yield new ports 10 & 11, with correspondingly densified DM-RS. Again, it can be seen that ports 10 & 11 have DM-RS with twice the density of the DM-RS for either ports 2 & 6 or ports 3 & 7. The resulting configuration, however, supports only up to 4-layer MIMO transmission, as there are only four ports (ports 8, 9, 10, 11) and corresponding DM-RS available.

Figure 11:
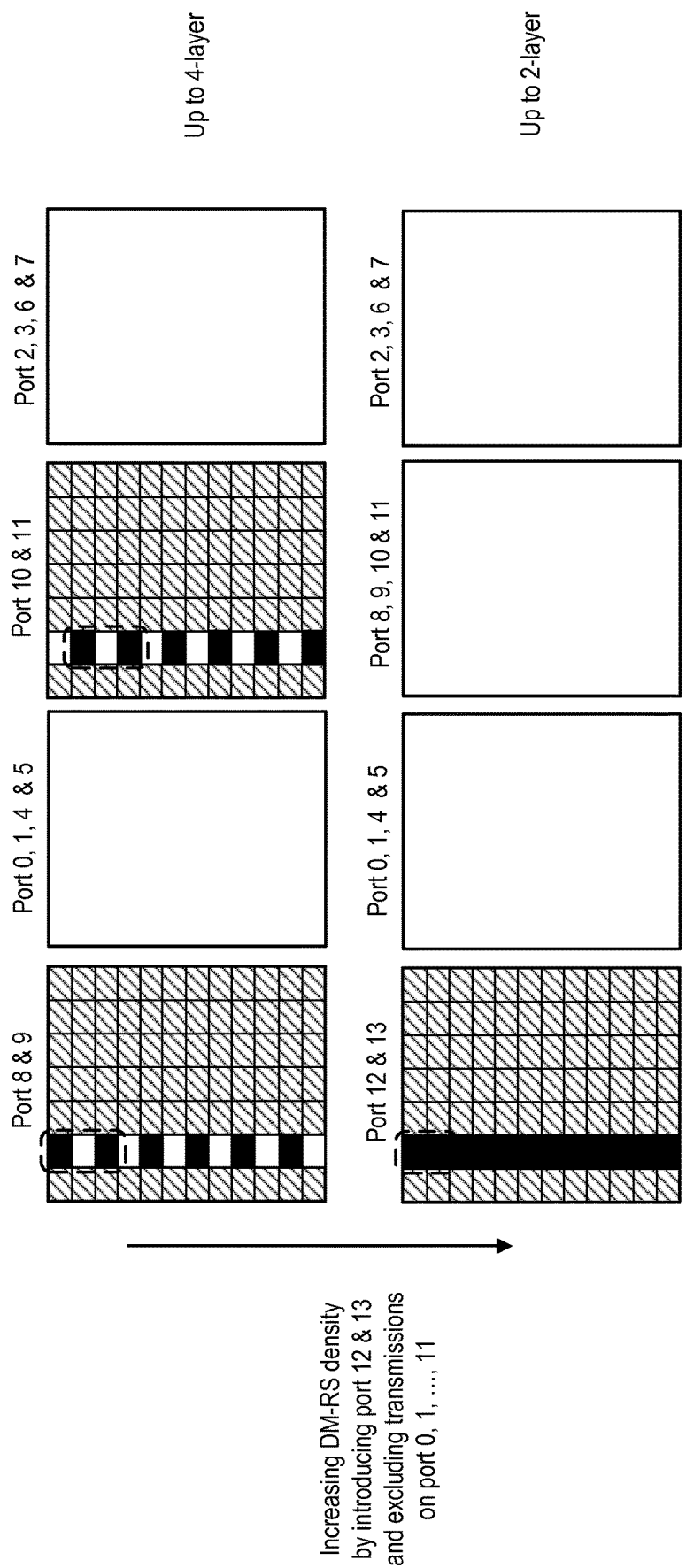
FIG. 11 shows rank-4 DM-RS patterns densified to a rank-2 DM-RS pattern, according to some embodiments.

FIG. 11 shows how the same approach can be extended to provide even further densification. The top portion of FIG. 11 shows the result of going from a 6-port configuration to a 4-port configuration, as was shown in FIG. 10. The bottom portion of FIG. 11 shows the merger of ports 8 & 9 with ports 10 & 11, to yield new ports 12 & 13. These new ports have four times the density of any of the starting ports 0-7, and twice the density of ports 8-11. The result, however, is a configuration that supports the transmission of only one or two layers.

It will be appreciated that the various densification patterns shown in FIGS. 9-12 can be used to provide a UE with different densities of DM-RS for different layers in a multi-layer transmission, for example. These various patterns can also or instead be used to provide different UEs with different DM-RS densities, for MU-MIMO transmissions.

Figure 12:
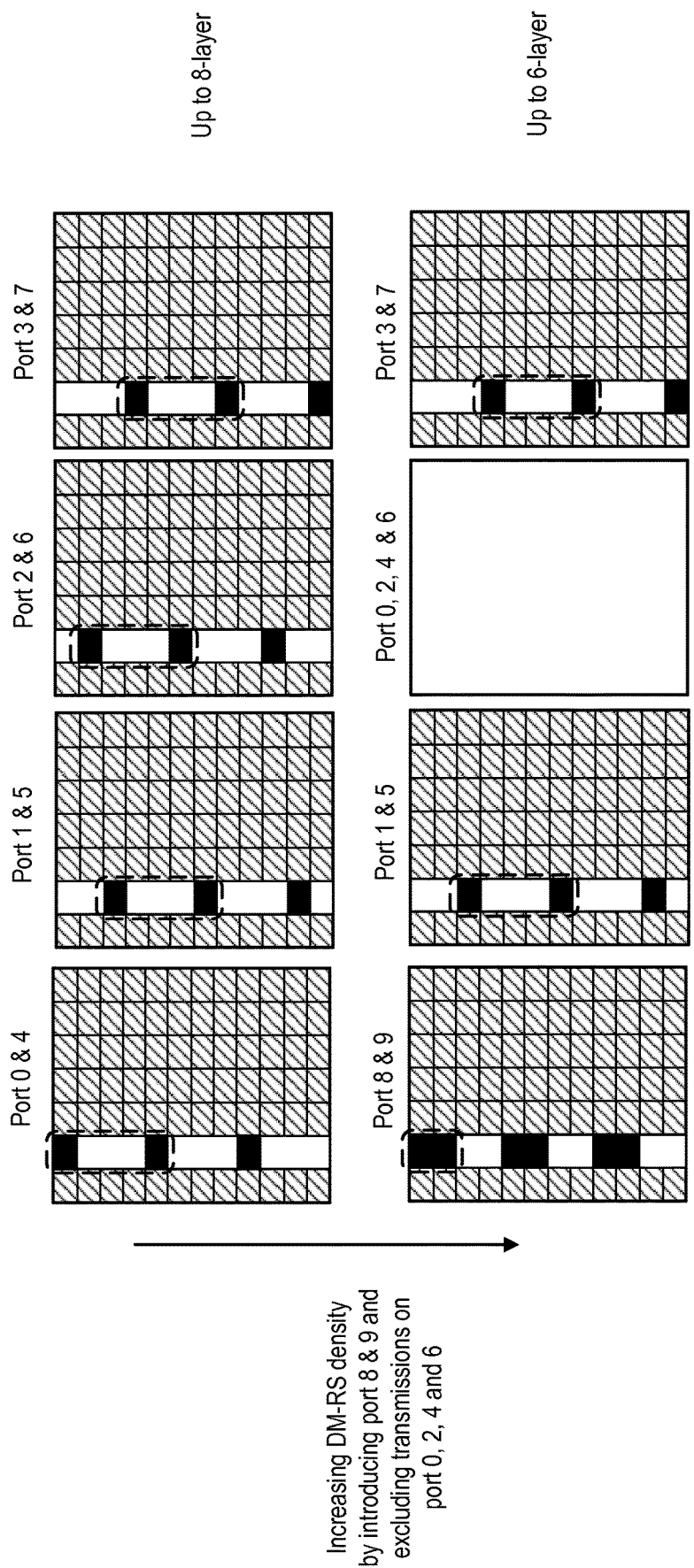
FIG. 12 shows baseline rank-8 DM-RS pattern densified to an alternative rank 6 pattern, according to some embodiments.

The above described techniques of densifying a comb-based DM-RS pattern is one example of how to merge different ports that is particularly suitable for when a low cubic metric is needed and an advanced channel estimator is feasible. These techniques may be used in the uplink in a radio network, for example, where a low power UE is transmitting and an advanced base-station is doing the channel estimation. In some other embodiments, the merging of pairs of antenna ports and their corresponding DM-RS is instead performed using pairs of antenna ports that use adjacent resource elements for their DM-RS, as depicted in the example configuration shown in FIG. 12. As seen in FIG. 12, antenna ports 0 & 4 and their DM-RS's are merged with antenna ports 2 & 6 and their DM-RS's, to obtain new ports 8 & 9. With this pairing/merging, the resulting DM-RS for ports 8 & 9 occupy pairs of immediately adjacent (in the frequency-domain) resource elements.

The approach shown in FIG. 12 might be used, for example, in the downlink, when a base station is transmitting to a set of multiple UEs and a simpler channel estimation procedure is desired for the UE, e.g., due to power and computational restrictions. FIG. 12 shows the densification and port restriction of going from highest rank 8 to highest rank 6. The procedure of further densifying the DM-RS pattern and restricting the available ports of FIG. 12 follow the same principle as discussed above, and as illustrated with FIGS. 10 and 11.

Another use case for the selective use of adaptively denser DM-RS ports could be the use of shared reference signals, where these reference signals are potentially wideband, and shared among multiple users served by a transmitting node. As suggested above, still another use case for unequal DM-RS density is to adapt the DM-RS density in MU-MIMO scheduling, where one user may have worse SINR conditions and needs more energy for DM-RS compared to users that have better SINR.

As briefly noted above, the increased densification of DM-RS according to the structured techniques described herein corresponds to a decrease in the number of antenna ports that are supported, and thus to a decrease in the maximum possible rank for a transmission. This correlation, between increased densification and reduced maximum rank, can be exploited to minimize the number of bits needed to signal the DM-RS pattern that is in use at any given time and the corresponding maximum rank.

Table 1 in FIG. 8A illustrates an example approach to signaling in which two bits are used to indicate both the set of available ports as well as the associated rank restriction, for a certain DM-RS pattern. It can be observed that this table does not specify the particular mapping function for rank and DM-RS; rather the table simply illustrates that the number of bits for signaling this information scales with the number of possible available DM-RS, i.e., with the maximum supported rank.

In some embodiments, an indication of the number of layers and which specific ports to use when receiving a data transmission is indicated to the UE in the scheduling DCI message. This explicit signaling allows the use of MU-MIMO scheduling, using orthogonal antenna ports between different UEs, where the used ports may have different DM-RS densities, as exemplified in FIG. 9 to FIG. 11, where ports 0-7 have the lowest DM-RS density, ports 8-11 have medium DM-RS density, and ports 12-13 have the highest DM-RS density.

Note that terminology from LTE is being used here, to refer to the downlink message that carries scheduling information, i.e., information indicating granted downlink time-frequency resources and indicating the modulation and coding scheme to be applied to data transmitted in those resources. Systems employing the presently disclosed techniques may use scheduling messages described using different terminology, and having different formats than those used in LTE.

In some embodiments, the following MU-MIMO scheduling examples are possible, but not necessarily exclusive. Note that the "Values" provided below refer to entries in the table of FIG. 8B, which may in several embodiments be signaled to the UE in a DCI message.

In cases of simultaneously scheduling UE1 and UE2 with the same port density, examples may include: two rank-1 transmissions (e.g., ports 0 and 1: Values 0 and 1); two rank-2 transmissions (e.g., port 0-1 and 2-3: Values 4 and 5); or two rank-2 transmission (e.g., port 8-9 and 10-11: Values 11 and 13). In cases of simultaneously scheduling UE1 and UE2 with different port densities, examples may include two rank-1 transmission (e.g., ports 2 and 8: Value 2 and 1); or a rank-2 and a rank-4 transmission (e.g., ports 8-9 and 2-3-6-7: Values 11 and 9).

It can also be seen from Table 2 of FIG. 8B that for a single UE, it is possible to schedule rank-1 or rank-2 transmissions with any of three different DM-RS densities, corresponding to, for example, Values 0, 10, and 14 for rank 1, and to Values 4, 11, and 15 for rank 2, using the dynamic indications provided by signaling the "Value" parameter to the UE.

Figure 13:
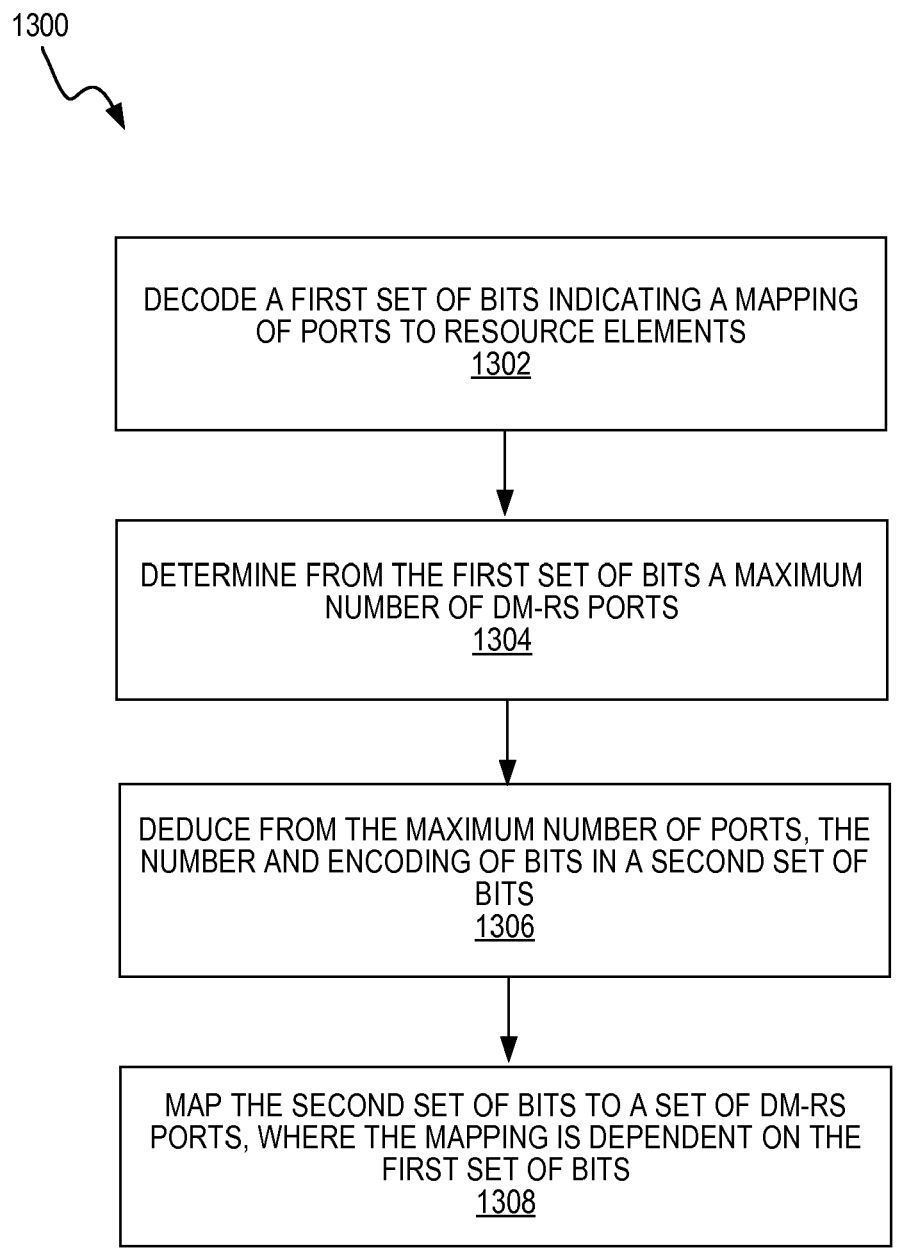
FIG. 13 is a process flow diagram illustrating another method in the wireless device, according to some embodiments.

With the above description and detailed examples in mind, it will be appreciated that FIG. 13 is a process flow diagram illustrating an example method 1300 for decoding and applying signaling bits that indicate both a mapping of reference signals (DM-RS signals in this example process) for various antenna ports to resource elements of a received signal and a maximum number of DM-RS ports (i.e., a maximum possible rank for multi-layer transmission). As shown at block 1302, the illustrated method 1300 begins with decoding a first set of bits, e.g., in a DCI message, where the first set of bits indicate a mapping of ports to resource elements. More specifically, the first set of bits indicate a particular set of available ports, from a plurality of possible sets of available ports, as well as indicating the density of the DM-RS for each port in the set. As was illustrated in Table 1 of FIG. 8A, this can be done in a system that supports up to 8-layer transmission using only two bits, assuming that there is a pre-determined association between the possible bit sequences and the sets of available ports. As shown in FIG. 8A, for example, a two-bit sequence of 00 would indicate that the available port set consists of ports 0-7, while a two-bit sequence of 11 would indicate that the available port set consists of only ports 12 and 13. The receiving device (e.g., a UE) would know from previously configured information that ports 0-7 have particular (low-density) DM-RS patterns, while ports 12 and 13 have different, and higher-density DM-RS patterns.

As shown at block 1304, the maximum number of DM-RS ports (and hence the maximum rank for transmission) can be determined from the first set of bits. Using the mapping in FIG. 8A, for example, a receiving device would know that bit sequence 00 indicates a maximum supported rank of 8, while bit sequence 11 indicates a maximum supported rank of 2.

At this point, the receiving device knows the transmitted DM-RS patterns, and their mapping to antenna ports, but does not know specifically which ports are scheduled for the receiving device. This latter information can be signaled with a second set of bits. Because the first set of bits indicates the maximum supported rank, the most efficient coding of the second of bits will depend on the content of the first set of bits, or, equivalently, on the maximum supported rank indicated by the first set of bits. For example, if the first set of bits indicates a maximum supported rank of two (e.g., with a bit sequence of 11, as shown in FIG. 8A), then the second set of bits need only include two bits to signal that either port 12 or 13 (for a rank-1 transmission), or both (for a rank-2 transmission), are scheduled for the receiving device. On the other hand, if the first two bits indicate that up to 8-layer transmissions are available, e.g., using some or all of ports 0-7 as shown in the top portion of FIG. 9, then four or five bits may be needed to indicate the rank of a scheduled transmission and the corresponding ports, depending on how many different combinations of ports are permitted for each allowed transmission rank. Similarly, if the first two bits indicate that only up to 4-layer transmissions are available, e.g., using ports 8-11 as shown in the bottom portion of FIG. 10, then perhaps three or four bits may be needed to indicate the rank of a scheduled transmission and the corresponding ports, again depending on how many different combinations of ports are permitted for each allowed transmission rank (one to four, in this scenario).

Accordingly, it is seen that both the number of bits and the specific encoding of the bits in the second set of bits may depend on the value conveyed in the first set of bits, in some signaling schemes according to the presently disclosed techniques. Thus, block 1306 of FIG. 13 indicates that the illustrated method includes deducing, from the maximum number of ports indicated by the first set of bits, both the number and the specific encoding scheme for bits in a second set of received bits. As shown at block 1308, the contents of this second set of bits (which may vary in number, depending on the value carried by the first bits) are then mapped to a specific set of DM-RS ports. As indicated above, this mapping is dependent on the value carried by the first set of bits, in some embodiments. It will be appreciated that this approach provides for a great deal of flexibility in indicating specific DM-RS patterns, of adaptable densities, along with an indication of transmission rank and specifically used ports, while also allowing the number of signaled bits to be kept as low as possible.

Note also that while methods 500 is described as being carried out in a network node such as a base station, in communication with a wireless device, and while methods 700 and 1300 are described as being carried out in a wireless device, the methods 500, 700 and 1300 are more generally applicable to first and second wireless nodes. In some cases, the network node 30 may be configured to perform methods 700 and 1300, and the wireless device 50 may be configured to perform method 500.

As discussed in detail above, the techniques described herein, e.g., as illustrated in the process flow diagrams of FIGS. 5, 7 and 13, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 14:
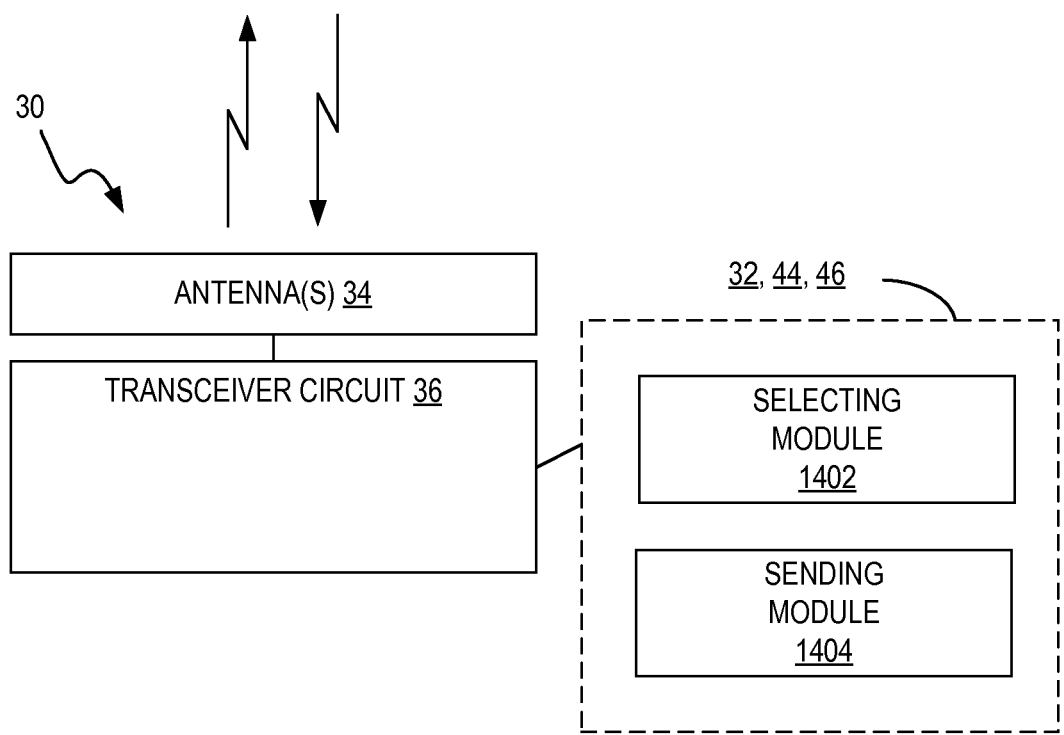
FIG. 14 is a block diagram illustrating a functional representation of a method in the network node, according to some embodiments.

For example, FIG. 14 is a block diagram illustrating a functional implementation as carried out in a first wireless node, or a network node 30 such as a base station. The implementation includes a selecting module 1402 for selecting a set of reference signal (e.g., DM-RS) antenna ports for use in transmitting data to or receiving data from one or more other wireless nodes in a given transmit time interval, from a plurality of sets of reference signal antenna ports that are available for use, where the plurality of sets of reference signal antenna ports include reference signal antenna ports having different reference signal densities in the frequency dimension, the time dimension, or both. The implementation also includes a sending module 1404 for sending a message (e.g., scheduling message) to a second wireless node indicating a reference signal assignment to the second wireless node, wherein the message includes an indication of the selected set of reference signal antenna ports.

Figure 15:
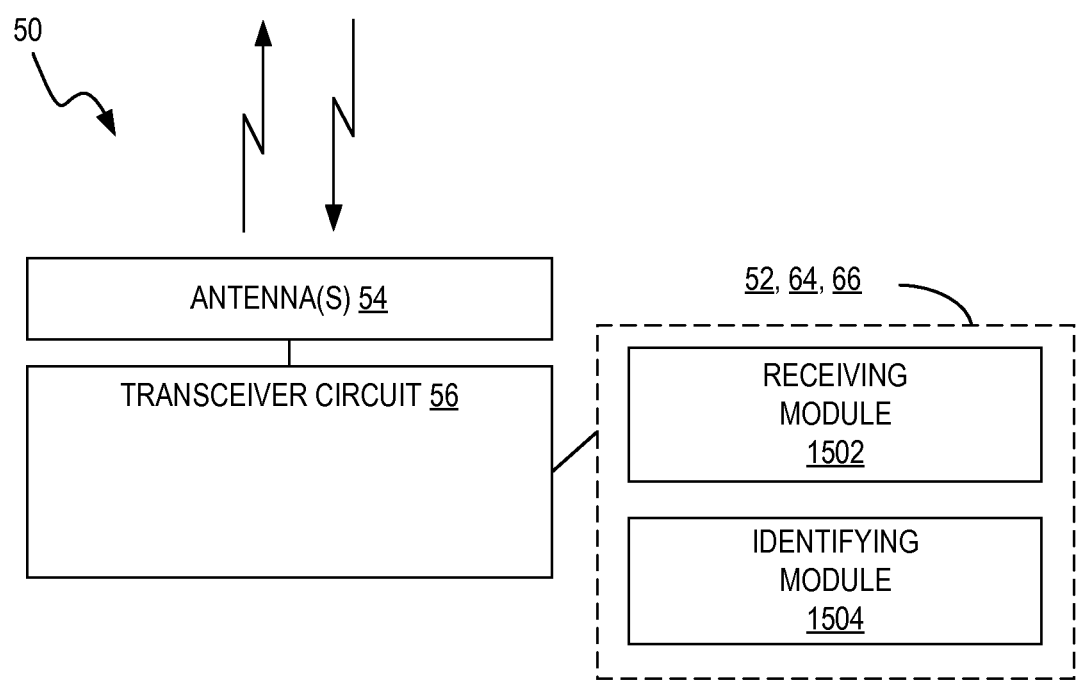
FIG. 15 is a block diagram illustrating a functional representation of a method in the wireless device, according to some embodiments.

FIG. 15 is a block diagram illustrating a functional implementation as carried out in a second wireless node, or a wireless device 50 such as a UE. The implementation includes a receiving module 1502 for receiving, from a first wireless node, a message indicating a reference signal assignment to the second wireless node, wherein the message includes an indication of a set of reference signal antenna ports selected from a plurality of available sets of reference signal antenna ports known to the second wireless node, and wherein the plurality of sets of reference signal antenna ports include reference signal antenna ports having different reference signal densities in the frequency dimension and/or time dimension. The implementation also includes an identifying module 1504 for identifying the indicated set of reference signal antenna ports from the received indication.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a first wireless node, the method comprising:

selecting a set of demodulation reference signal antenna ports for use in transmitting data to or receiving data from a plurality of User Equipments, UEs, in a given transmit time interval, from a plurality of sets of demodulation reference signal antenna ports that are available for use, wherein the plurality of sets of demodulation reference signal antenna ports include demodulation reference signal antenna ports having different demodulation reference signal densities in frequency dimension, time dimension, or both; and sending a message to a UE indicating a demodulation reference signal assignment to the UE, wherein the message includes an indication of the selected set of demodulation reference signal antenna ports;

sending a second message to a different UE indicating a demodulation reference signal density for a layer in a multi-layer transmission; and wherein the transmitting or receiving of data is on a plurality of layers of a Multi-User Multiple-Input Multiple-Output, MU-MIMO, transmission; and wherein the selected set of demodulation reference signal antenna ports for the UE has a different reference signal density than for the different UE using a different layer in the MU-MIMO transmission.

2. The method of claim 1, wherein the message indicates a number of layers of a multi-layer transmission on which the selected set of demodulation reference signal antenna ports are for use in the transmitting or receiving of data.

3. The method of claim 1, wherein the message indicates one or more values of a plurality of values, wherein the indicated one or more values correspond to the selected set of one or more demodulation reference signal antenna ports, and wherein the plurality of values corresponds to demodulation reference signal antenna ports having different demodulation reference signal densities and/or a different number of layers on which the selected set of demodulation reference signal antenna ports are for use.

4. The method of claim 3, wherein the plurality of values is a single set of values corresponding to all of the plurality of sets of demodulation reference signal antenna ports that are available for use.

5. The method of claim 1, wherein the message indicates to the UE different demodulation reference signal densities for different layers in a multi-layer transmission.

6. The method of claim 1, wherein sending the message comprises sending a scheduling message.

7. The method of claim 1, wherein the demodulation reference signal antenna port corresponds to a mapping on a code-time-frequency grid.

8. A first wireless node, wherein the first wireless node is adapted to:
select a set of demodulation reference signal antenna ports for use in transmitting data to or receiving data from a plurality of Users Equipments, UEs, in a given transmit time interval, from a plurality of sets of demodulation reference signal antenna ports that are available for use, wherein the plurality of sets of demodulation reference signal antenna ports include demodulation reference signal antenna ports having different demodulation reference signal densities in frequency dimension, time dimension, or both;
send a message to a UE indicating a demodulation reference signal assignment to the UE, wherein the message includes an indication of the selected set of demodulation reference signal antenna ports; and
send a second message to a different UE indicating a demodulation reference signal density for a layer in a multi-layer transmission; and
wherein the transmitting or receiving of data is on a plurality of layers of a Multi-User Multiple-Input Multiple-Output, MU-MIMO, transmission; and
wherein the selected set of demodulation reference signal antenna ports for the UE has a different reference signal density than for the different UE using a different layer in the MU-MIMO transmission.

9. The first wireless node of claim 8, wherein the first wireless node is a base station.

10. A method, in a User Equipment, UE, the method comprising:
receiving, from a first wireless node, a message indicating a demodulation reference signal assignment to the UE, wherein the message includes an indication of a set of demodulation reference signal antenna ports selected from a plurality of available sets of demodulation reference signal antenna ports known to the UE, and wherein the plurality of sets of demodulation reference signal antenna ports include demodulation reference signal antenna ports having different demodulation reference signal densities in frequency dimension, time dimension, or both; and
identifying the indicated set of demodulation reference signal antenna ports from the received indication;
wherein the transmitting or receiving of data is on a plurality of layers of a multi-layer Multiple-Input Multiple-Output, MIMO, transmission; and
wherein the indicated set of demodulation reference signal antenna ports for the UE has a different demodulation reference signal density than indicated for a different UE.

11. The method of claim 10, wherein the message indicates a number of layers of a multi-layer transmission on which the selected set of demodulation reference signal antenna ports are for use in the transmitting or receiving of data.

12. The method of claim 10, wherein the message indicates one or more values of a plurality of values, wherein the indicated one or more values correspond to the selected set of one or more demodulation reference signal antenna ports, and wherein the plurality of values corresponds to demodulation reference signal antenna ports having different demodulation reference signal densities and/or a different number of layers on which the selected set of demodulation reference signal antenna ports are for use.

13. The method of claim 12, wherein the plurality of values is a single set of values corresponding to all of the plurality of sets of demodulation reference signal antenna ports that are available for use.

14. The method of claim 10, wherein the message indicates to the UE different demodulation reference signal densities for different layers in a multi-layer transmission.

15. The method of claim 10, wherein the message comprises a scheduling message.

16. The method of claim 10, wherein the demodulation reference signal antenna port corresponds to a mapping on a code-time-frequency grid.

17. The method of claim 10, further comprising receiving data, using the indicated demodulation reference signal antenna ports, wherein using the indicated demodulation reference signal antenna ports comprises performing channel estimation using reference signal symbols on the indicated set of demodulation reference signal antenna ports.

18. The method of claim 10, further comprising transmitting data to the first wireless node, accompanied by reference signal symbols on the indicated set of demodulation reference signal antenna ports.

19. A User Equipment, UE, wherein the UE is adapted to:
receive, from a first wireless node, a message indicating a demodulation reference signal assignment to the UE, where the message includes an indication of a set of demodulation reference signal antenna ports selected from a plurality of available sets of demodulation reference signal antenna ports known to the UE, wherein the plurality of sets of demodulation reference signal antenna ports include demodulation reference signal antenna ports having different demodulation reference signal densities in frequency dimension, time dimension, or both; and
identify the indicated set of demodulation reference signal antenna ports from the received indication;

wherein the transmitting or receiving of data is on a plurality of layers of a Multi-User Multiple-Input Multiple-Output, MU-MIMO, transmission; and wherein the indicated set of demodulation reference signal antenna ports for the UE has a different demodulation reference signal density than indicated for a different UE.

20. The UE of claim 19, wherein the first wireless node is a base station.

21. A first wireless node configured for operation in a wireless communication network, wherein the first wireless node comprises a transceiver circuit and a processing circuit operatively coupled to the transceiver circuit, wherein the processing circuit is configured to select a set of demodulation reference signal antenna ports for use in transmitting data to or receiving data from one or more other wireless nodes in a given transmit time interval, from a plurality of sets of demodulation reference signal antenna ports that are available for use, where the plurality of sets of demodulation reference signal antenna ports include demodulation reference signal antenna ports having different demodulation reference signal densities in frequency dimension and/or time dimension, the processing circuit is configured to send to a User Equipment, UE, via the transceiver circuit, a message indicating a demodulation reference signal assignment to the UE, where the message includes an indication of the selected set of demodulation reference signal antenna ports;

the processing circuit is configured to send a second message to a different UE indicating a demodulation reference signal density for a layer in a multi-layer transmission; and wherein the transmitting or receiving of data is on a plurality of layers of a Multi-User Multiple-Input Multiple-Output, MU-MIMO, transmission; and wherein the selected set of demodulation reference signal antenna ports for the UE has a different reference signal density than for the different UE using a different layer in the MU-MIMO transmission.

22. A User Equipment, UE configured for operation in a wireless communication network, wherein the UE comprises a transceiver circuit and a processing circuit operatively coupled to the transceiver circuit, wherein the processing circuit is configured to receive from a first wireless node, via the transceiver circuit, a message indicating a demodulation reference signal assignment to the UE, where the message includes an indication of a set of demodulation reference signal antenna ports selected from a plurality of available sets of demodulation reference signal antenna ports known to the UE, and the plurality of sets of demodulation reference signal antenna ports include demodulation reference signal antenna ports having different demodulation reference signal densities in frequency dimension and/or time dimension, and the processing circuit is configured to identify the indicated set of demodulation reference signal antenna ports from the received indication;

wherein the transmitting or receiving of data is on a plurality of layers of a Multi-User Multiple-Input Multiple-Output, MU-MIMO, transmission; and wherein the indicated set of demodulation reference signal antenna ports for the UE has a different demodulation reference signal density than indicated for a different UE.

* * * * *